United States Patent [19]
Sekhar et al.

[11] Patent Number: 5,985,114
[45] Date of Patent: Nov. 16, 1999

[54] CARBON BODIES RESISTANT TO DETERIORATION BY OXIDIZING GASES

[75] Inventors: Jainagesh A. Sekhar; James Jenq Liu, both of Cincinnati, Ohio; Jean-Jacques Duruz, Geneva, Switzerland

[73] Assignee: Moltech Invent S.A., Luxembourg, Luxembourg

[21] Appl. No.: 08/929,497

[22] Filed: Sep. 15, 1997

[51] Int. Cl.$^6$ .................................................. C25B 11/00
[52] U.S. Cl. .................. 204/290 R; 204/294; 204/243.1; 502/101; 502/120; 502/127; 427/113; 427/430.1
[58] Field of Search ............................... 204/294, 290 R, 204/243.1; 429/42, 40; 502/101, 120, 127; 427/113, 430.1

[56] References Cited

U.S. PATENT DOCUMENTS

| | | | |
|---|---|---|---|
| 5,364,513 | 11/1994 | Sekhar et al. | 204/294 |
| 5,486,278 | 1/1996 | Manganiello et al. | |
| 5,753,382 | 5/1998 | Sekhar et al. | 429/42 |

FOREIGN PATENT DOCUMENTS

| | | |
|---|---|---|
| 1107113 | 4/1954 | France . |
| 760623 | 11/1956 | United Kingdom . |
| WO 97/25294 | 7/1997 | WIPO . |
| WO 97/26227 | 7/1997 | WIPO . |

OTHER PUBLICATIONS

"The Reactivity of Carbon Electrodes and Its Dependence on Inorganic Catalysts and Inhibitors" by Gosta Wranglen from Jernkont.Ann.142 (1958):10 No month available.

*Primary Examiner*—Bruce F. Bell
*Attorney, Agent, or Firm*—Jayadeep R. Deshmukh

[57] ABSTRACT

A carbon body, in particular a pre-baked anode of an electrolytic cell for the production of aluminium by the electrolysis of alumina in a molten fluoride electrolyte is treated over its surfaces to improve the resistance thereof to deterioration during operation of the cell by air and oxidizing gases released at the anode, by treating the body with a treating liquid comprising a precipitable boron-containing compound and an additive, said additive being present in an amount so that substantially no separate phase from said the precipitate of said boron-containing compound is formed upon curing. Suitable boron oxide additives include colloidal alumina, silica, yttria, ceria, thoria, zirconia, magnesia, lithia, monoaluminium phosphate, cerium acetate and mixtures thereof. The same treatment can also be applied to a carbon mass forming a Söderberg anode and to cell sidewalls.

10 Claims, 2 Drawing Sheets

CARBON BODIES RESISTANT TO DETERIORATION BY OXIDIZING GASES

FIELD OF THE INVENTION

This invention relates in general to the treatment of carbon bodies which are exposed to high temperature oxidizing gases in order to improve the resistance of the bodies to deterioration by the oxidizing gases.

The invention is concerned in particular with carbon bodies which are used as components of electrolytic cells for the production of aluminium, for example by the electrolysis of alumina in a molten fluoride electrolyte such as cryolite, wherein, in use of the cell, the carbon components are exposed to air and anodically-generated oxidizing gases.

One aspect of the invention is the method of treating such cell components or other carbon bodies to improve their resistance to deterioration by oxidizing gases at high temperatures. Further aspects of the invention concern the treated cell components and other carbon bodies, aluminium production cells including these components, an improved treating liquid, and use of this treating liquid to improve the oxidation resistance of carbon bodies while simultaneously maintaining the level of boron in the product aluminium at acceptable levels.

BACKGROUND ART

Aluminium is produced conventionally by the Hall-Heroult process, by the electrolysis of alumina dissolved in cryolite-based molten electrolytes at temperatures up to around 950° C. In Hall-Heroult cells, the anodes are usually pre-baked carbon blocks that are consumed by the electrochemical reaction, corroded by contact with the electrolyte and disintegrated by the air and/or oxidizing gases present. Söderberg anodes made of a coherent carbon mass which solidifies in situ are also used.

Pre-baked anodes for aluminium production are made of a matrix of petroleum coke with pitch as binder. Their production involves various phases including preparing and treating the starting materials, mixing, forming and calcining at high temperature, followed by securing the current supply member by rodding.

The resistance of that part of the anode which remains outside the bath during cell operation is of paramount importance, not only to decrease the amount of anode consumption above the theoretical requirement but also to reduce the formation of carbon dust. It is advantageous to reduce carbon dust, for it causes of a reduction in current efficiency and an increase in cell temperature, and must be eliminated when it collects on the bath surface.

Of the several attempts to protect the anode, none has so far been entirely satisfactory. The normal protection by aluminium spraying is costly and not always impervious. The oxidation of the carbon anodes, in the Hall-Héroult cell, outside the bath leads to a loss for the aluminium producer. Typically, instead of the theoretical consumption of 0.33 kg of carbon per ton of aluminium, often more than 0.43 kg is lost, the difference being caused mainly by air and $CO_2$ burn.

Many elements or compounds catalyze the oxidation reaction of carbons but the inhibition of the oxidation reaction is more difficult to achieve. In general, the oxidation reactivity of carbon is reduced with absorbers, or with ceramic protection layers. Several absorber additives have been reported, such as metal, halogen compounds, and incorporated nitrogen. Ceramic protecting layers have been proposed, formed by low melting liquid glass, such as $B_2O_3$, $Cr_2O_3$, silica, etc. See, e.g., French patent no. 1,107,113 (1955) and U.K. patent no. 760,623.

The oxidation prevention treatment processes contemplated for the anode can be divided into two different groups, one is an additive added after the anode baking, the other is an additive added into the carbon paste. Until recently, only an aluminium coating protection treatment, or a thick layer of alumina and cryolite, has worked reasonably well for oxidation protection of commercial pre-baked anodes; however, these have several drawbacks, such as cost and difficulties in the cell operation. Several other oxidation prevention treatments have worked well in the laboratory but have fallen short of the expected performance when the same treatments have been applied to the anodes tested in commercial cells. No apparent reason has been forthcoming, and the discussion of such an effect has invariably been directed towards the possibility of the composition of the anode gases being the reason for such a difference.

When boron has been added to the anode paste in the form of elemental boron or boron compound, the oxidation rate of the carbon has been reduced but the consistent contamination of aluminium is usually unacceptable.

Recently, U.S. Pat. No. 5,486,278 (Manganiello et al.) has disclosed a treatment process which has been shown to significantly reduce the oxidation of the anode in the laboratory as well in commercial cell tests of pre-baked carbon anodes. This method comprises treating the anode or other component in a boron-containing liquid to intake the boron-containing liquid to a selected depth over parts of the surface to be protected. This selected depth is generally in the range of from 1 to 10 cm, preferably at least 1.5 cm and at most about 5 cm, preferably still at least about 2 cm and at most about 4 cm. This method was found to significantly reduce the oxidation of pre-baked anodes in laboratory tests and in commercial test cells. It was found unexpectedly that the greatly improved oxidation resistance obtained with this treatment is partly offset by a strength loss which could lead to burn-off after a critical weight loss when the anode is subjected to stress.

An article entitled "The Reactivity of Carbon Electrodes and Its Dependence on Organic Catalyst Inhibitors" by G östa Wranglen from *Jernkont. Ann.* 142 (1958):10, recognizes that oxidation resistance in carbon materials can be increased by adding, or impregnating or coating such materials with certain phosphates of zirconium, by impregnating with fused aluminum and by impregnating or coating with siliciferous compounds, such as treatment liquids including approximately 10 weight percent of substances such as: $Al_2O_3$, $CaF_2$, $CaB_4O_7$, $B_2O_3$ as $H_5BO_3$, $P_2O_5$ as $(NH_4)_2HPO_4$ and $V_2O_5$ as $NH_4VO_3$, in water. While the Wranglen article does mention the possibility of boron contamination, it does not suggest any way of taking advantage of the properties provided by impregnation with boron while avoiding contamination of the product aluminium due to excessive boron. In addition, the Wranglen article throughout recommends a minimum of at least 0.5 weight percent boron compound in the entire carbon substrate. Such a high content, is not permissible.

More recently, in U.S. patent application Ser. No. 08/584, 047 (Sekhar et al.), filed Jan. 10, 1996, and in International application PCT/US97/00304, filed Jan. 10, 1997 (Selkar et al.), (together referred to as "the high strength applications"), there has been disclosed a treating liquid containing at least one soluble boron compound and at least one additive from the group consisting of aluminium compounds, calcium compounds, sodium compounds, magnesium compounds, silicon compounds, elemental carbon, and elemental aluminium, the additive being in the form of a powder, in suspension, as a colloid, or in solution at 80° to 120° C. A preferred formulation, contains, per 100 ml of water (including a small quantity of a surface-active agent), 2–10 grams of boron (as metal in the form of a boron compound) and as additives, aluminium acetate boric together with at least one of calcium acetate and calcium carbonate (the total amount of additives not exceeding the amount of boron). Treatment by this treating liquid avoids the aforementioned strength loss problems. As described in the high strength applications, even with the highest achievable levels of boron concentration, the problem of process contamination is avoided because the protective boron compounds are present only in the surfaces needing protection, and only to a depth of a few centimeters or less. International applications PCT/US97/01080 (Sekhar et al.), filed Jan. 27, 1997 and PCT/US97/02041 (Sekhar et al.), filed Feb. 7, 1997 addressed this concern by proposing a lower boron treating liquid ("the low boron applications"), which will provide comparable oxidation resistance and strength properties as provided by the treating liquids described in the high strength applications. The treating liquids of the low boron applications contains a borate of an alkali metal or of an alkali earth metal, such as a diborate, metaborate, tetraborate and the like. Preferably, sodium tetraborate (such as $Na_2B_4O_7.10H_2O$) is used. More preferably, at least one nuclei-forming compound selected from aluminium acetate boric (such as $CH_3CO_2.Al(OH)_2.1/3H_3BO_3$), aluminium fluoride (such as $AlF_3.3H_2O$), gibbsite $(AM(OH)_3)$ or aluminium nitrate (such as $AlNO_3.9H_2O$) is used in combination with the borate of sodium. As used herein, a "nucleus" is defined as a tiny particle of solid that forms from a liquid as atoms cluster together; because these particles are large enough to be stable, nucleation has occurred and growth of the solid can begin. Preferably, the low boron treating liquid is an aqueous solution.

SUMMARY OF THE INVENTION

The primary object of the invention is to improve the resistance to oxidation of carbon bodies in particular carbon anodes or cell sidewalls of aluminium production cells by the incorporation of boron, without causing unacceptably high levels of boron in the product aluminium.

It is another object of the invention to provide a method of treating carbon bodies which results in better resistance to oxidation than prior art methods using comparable levels of boron-containing compounds.

The resistance to oxidation is improved by applying to a carbon body a treating liquid comprising a precipitable boron-containing compound and an additive for enhancing the oxidation resistance properties of said boron-containing compound when precipitated and cured, and precipitating and curing the boron-containing compound. "Boron-containing compound" as used herein includes boron oxide as part thereof The additive is present in an amount effective to modify the morphology of the precipitate of said boron-containing compound and such that substantially no separate phase from the precipitate of the boron-containing compound, is formed, upon curing.

The boron-containing compound fuses to form a homogeneous mass without melting, upon curing (heating). It is believed that the inclusion of low levels of an additive in the treating liquid improves the coating morphology by eliminating or reducing porosity and btN improving growth conditions during precipitation. It is believed that the additive at a small level, results in boric acid protection with improved oxidation properties at relatively low boron loadings. In principle the additive is believed to aid the elimination or reduction of residual porosity by preventing the entrapment of pores inside grains of boron-containing compounds, so called break-away of pores from grain boundaries. It is believed that the reduction in porosity would also reduce the strength loss described in the high strength applications. In addition, the additive is believed to control grain growth in the late stages of curing, thereby making possible generation of microstructures composed of uniform, isometric grains by a process designated as normal grain growth.

THE METHOD OF THE INVENTION

Figure 1:
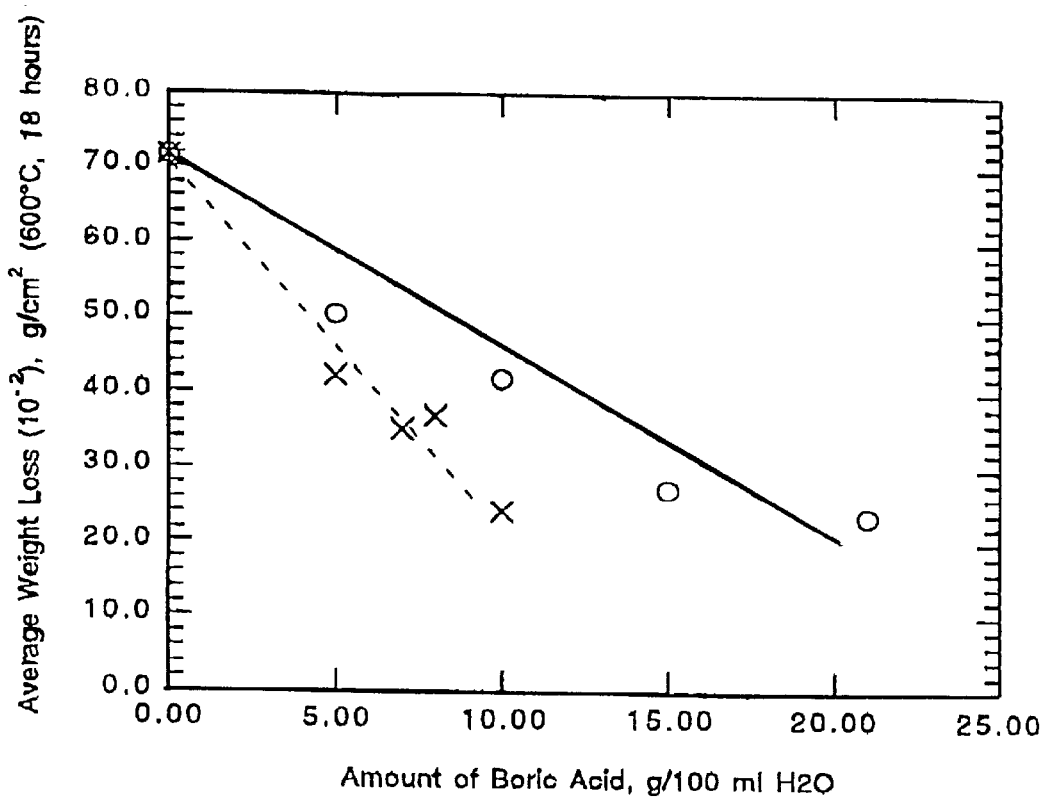
FIG. 1 graphically shows average oxidation weight loss at 600° C. as a function of varying amounts of boric acid either with or without 0.1 ml of colloidal silica.

The invention provides a method of treating a carbon body, in particular a carbon-based anode or sidewall of an electrolytic cell for the production of aluminium, in particular by the electrolysis of alumina in a molten fluoride electrolyte such as cryolite, to improve the resistance thereof to deterioration by the attack of oxidizing gases, using the treating liquids disclosed herein. As used herein, "carbon bodies" is meant to refer to bodies comprising carbon, such as bodies comprising petroleum coke and pitch, as well as bodies comprising composite carbon-based materials.

According to the invention, the treating liquid comprises a boron-containing compound and at least one additive as described above; the additive is present in an amount effective to modify the morphology of the precipitate of said boron-containing compound and such that substantially no separate phase from the boron-containing compound is formed upon curing. Preferably, the additive is present at a level of up to about 2 weight percent, even more preferably up to about 0.8 weight percent, of the total of the additive and the boron oxide present in the boron-containing compound.

Suitable boron-containing compounds may be selected from the group consisting of boron oxide, boric acid, precursors of boric acid which form boron oxide, tetraborates of alkali metals and mixtures thereof. Preferably, the boron-containing compounds are selected from the group consisting of boric acid, boron oxide and sodium tetraborate. Suitable additives may be selected from the group consisting of colloidal alumina, silica, yttria, ceria thoria, zirconia, magnesia, lithia, monoaluminium phosphate, cerium acetate and mixtures thereof. Preferably, the additives are selected from the group consisting of colloidal silica and colloidal alumina.

The treatment according to the invention preferably provides a protected layer of 0.5 to 10 centimeters. The treatment also improves the oxidation resistance while reducing, or at least maintaining at the same level, the boron contamination of the anode compared to impregnation with boric acid alone, as disclosed in U.S. Pat. No. 5,486,278. (Manganiello et al.)

The treating liquid may further optionally include at least one aluminium compound and/or at least one calcium compound. If the aluminium and calcium compounds are present together, preferably calcium aluminate may be formed. See, for example the description of PCT/US97/00304. (Sekhar et al.) The high strength applications are hereby incorporated by reference herein.

The treatment method applies particularly to pre-baked carbon anodes, but may also be applied to the outer part of Söderberg anodes as they move down in the conventional manner.

The treatment method is also applicable to a cell sidewall, particularly the upper part of the cell sidewall that is exposed to air and the effect of oxidizing gases during use, as well as the lower part which is exposed to carbo-oxidation reactions with $CO_2$ at the surface or to the part of the sidewall submerged in the electrolyte.

In the case of cell sidewalls, the protective effect can be enhanced by top coating the exposed part of the impregnated sidewalls with a layer of refractory material, e.g. particulate diboride in a colloidal carrier, such as titanium diboride in colloidal alumina or colloidal silica, as described in U.S. Pat. No. 5,651,874. (de Nora et al.) The sidewall previously treated with the treating liquid may be coated with a composition comprising particulate titanium diboride in a colloid selected from the group consisting of colloidal alumina, silica, yttria, ceria, thoria, zirconia, magnesia, lithia, monoaluminium phosphate. cerium acetate, and mixtures thereof; preferably the composition comprises particulate titanium diboride in colloidal alumina.

The following details of the treatment process are given with reference to the particular components and methods used, but also apply in general to any carbon component subjected to attack by oxidizing gases.

The treating liquid comprises a boron-containing compound, such as, for example. boric acid or sodium tetraborate, and at least one additive, preferably in colloidal form. Preferably the additive is present at a level up to about 2 weight percent, more preferably up to about 0.8 weight percent, of the total of the additive and the boron oxide present in the boron-containing compound. The treating liquid preferably further includes at least one of aluminium acetate boric, aluminium fluoride, gibbsite and aluminium nitrate ("the nuclei-forming compounds"). More preferably, the solvent is aqueous.

The treating liquid preferably contains from 2 to 50 weight %, more preferably from 4 to 30 weight %, of the boron-containing compounds. Preferably, the nuclei-forming compounds are added at a level of less than 1 weight percent of the total treating liquid. Even more preferably, the nuclei-forming compounds are added in a quantity which does not exceed about ⅕th, even more preferably no more than about ¹⁄₁₀th, of the boron-containing compound. In one preferred embodiment, the treating liquid comprises from about 2 to about 20 grams of boron oxide from a boron-containing compound and from about 0.004 to 0.4 grams of an additive, per 100 ml of treating liquid.

Preferably, the compounds are in an aqueous solvent at a temperature in the range from 10° C. to 200° C., preferably 20° C. to 120° C. and more preferably 60° C. to 90° C., these conditions ensuring excellent penetration of the treating liquid into the porous carbon. It is advantageous to carry out the treatment with a heated liquid in order to increase the solubility of the boron compound and to decrease the treatment time. Preferably the carbon body substrate, e.g. the anode, is at a temperature in the range of from 20° C. to 200° C. If necessary the carbon body may be preheated. When using an aqueous solvent based treating liquid, the liquid may advantageously be steamed on to the substrate without heating the substrate. Carrying the treatment out at ambient temperature is possible and also convenient because no special heating equipment is required.

At low temperatures, certain solvents such as methanol, ethylene glycol and glycerin will be preferred, possibly with additives to enhance the solubility of the boron compound, and the treatment time may be extended. When water is used as the solvent, surfactant agents, in particular tensio-active cationic agents devoid of components that would undesirably contaminate the aluminium produced and devoid of components that promote oxidation of the carbon, may be used. Anionic tensio-active agents can also be used. These surface-active agents may possibly be present together with other solubility improving agents such as tartaric acid or citric acid. The liquid may of course also be heated to improve and speed up the impregnation of the anode.

The use of surface active agents is an important factor in accelerating penetration of the liquid and in obtaining impregnation to a sufficient depth of several centimeters in only a few minutes since long treatment times could make the process impractical and uneconomical. The coefficient of diffusion of the liquid into the porous carbon structure and the wettability of the carbon by the liquid will influence the rate and the degree of penetration. Liquids with low surface tension providing an angle of contact with the carbon of less than 90° provide adequate wettability and facilitate penetration. A suitable high temperature will also enhance diffusion of the liquid.

When water is chosen as solvent, a surfactant such as those available under the trade names NONIDET P 40 and SPAN 85, from Fluka, and GLUCOPON 225, DEHYPON LS, QUAFIN LDM and QUAFIN CT, from Henkel, can be used in order to achieve an acceptable low treatment time. Preferably, the surfactant is used at a level ranging from 0.05 to 0.25 weight percent of the total treating liquid.

The carbon body to be treated, such as, for example, an anode or a side-wall, is then immersed in the treating liquid. Immersion is continued for a set time, e.g. from 2 to 60 minutes, or until a desired intake of the solution into the treated surfaces. The treatment time depends principally on the exposed surface area of the carbon body and its porosity, as well as temperature. It has been observed that prolonging the treatment does not significantly increase boron concentration.

Anodes or other components are conveniently impregnated simply by dipping them into the treating liquid, which can take place in ambient conditions. The impregnation may be assisted by the application of a pressure differential, by applying pressure or a vacuum. Other ways of speeding up impregnation can also be used, such as the application of ultrasounds. Alternative application methods include steaming, painting, dabbing, vacuum impregnation, coating and the like.

Usually, a single impregnation suffices, but the impregnation and drying may be repeated, if necessary, until the treated anode surface is saturated with the treating liquid.

The vapors produced in the described conditions are not toxic and can be freely released into the air without a need for costly treatment installations.

In the manner described above, the treating liquid impregnates the carbon anode/substrate to a depth of 0.5 to 10 cm, for example approximately 2 to 4 or 5 cm. For a pre-baked anode, only the top surface and the top part of the side surfaces (shoulders) need to be impregnated.

By impregnating the parts of the anode to be protected—namely the side and top surfaces—with a small quantity of the treating liquid to a depth of 0.5 or several centimeters, a long-lasting protective effect is achieved because the surfaces exposed to oxygen wear away very slowly over a long period. The use of the treating liquids of the present invention enhances anode strength while avoiding undesirable contamination of the aluminium produced.

The treatment is conveniently applied to carbon anodes. Such anodes are usually made of petroleum coke and pitch, and have an open porosity of at least 5%, usually in the range 5% to 30%, preferably from 5% to 20%. The treatment can also be applied to porous carbon-based materials. For example, the anode may also be made of a composite carbon-based material comprising at least one further component such as refractory oxycompounds, in particular alumina. Examples of such materials are described in WO 93/25494. (Sekhar et al.) Carbon bodies made of a composite material predominantly comprising petroleum coke and pitch and having an open porosity of at least 5% may be treated with the treating liquid.

The impregnation treatment of a pre-baked anode according to the invention is made after calcining which provides the anode surface with the highest porosity, thereby improving the penetration of the liquid to a depth of 0.5 or several centimeters.

Oxidation of the anodes increases with porosity. Thus, with the impregnation treatment the most porous part of the anode, which is most prone to damage by oxidation, is protected. In other words, more porous parts of the surface to be protected are penetrated more deeply by the treating liquid, providing greater protection where needed.

The intake of the treating liquid into the carbon body can be monitored by checking the level of the treating liquid, or simply by the time of immersion for a given treating liquid and a carbon body of given porosity.

The top surfaces and at least the upper parts of the shoulders of a pre-baked anode can be immersed in the treating liquid by dipping the anode upside down in the liquid. There is no need to treat the bottom of the anode where the electrochemical reaction takes place. In this way, only those parts of the anode which need protection are treated, and the amount of boron in the anode (and hence in the aluminium produced), is minimized.

When it is desired to treat rodded anodes, i.e. when the anode's current lead-in rod has already been connected to the top surface, it is more convenient to immerse the anodes with the rodded top side up. In this case, the lower surface of the anode which does not need protection against oxidation can, for example, either be temporarily blocked by a product or be temporarily isolated by a suitable device which prevents impregnation of the treating liquid and which product/device can be removed afterwards or which volatilizes. For example, the process can be carried out using the apparatus described in WO 97/26627 (Berclaz et al.)

As an alternative, the carbon substrates can be treated by spraying the treating liquid as steam under high pressure. In the case of Söderberg anodes, the treating liquid can be sprayed as steam onto the outer surface of the mass.

FURTHER ASPECTS OF THE INVENTION

In addition to the above-described methods, the invention also concerns a carbon body which has a part of its surface exposed during use to high temperature oxidizing gases, said surface part being treated, to improve the resistance thereof to deterioration by said oxidizing gases, by impregnation with a treating liquid which comprises a precipitable boron-containing compound and an additive. The additive is present in an amount such that substantially no separate phase from the precipitate of the boron-containing compound, is formed, upon curing.

Suitable boron-containing compounds may be selected from the group consisting of boron oxide, boric acid, precursors of boric acid which form boron oxide, tetraborates of alkali metals and mixtures thereof. Preferably, the boron-containing compounds are selected from the group consisting of boric acid, boron oxide, and sodium tetraborate. Suitable additives may be selected from the group consisting of colloidal alumina, silica, yttria, ceria, thoria, zirconia, magnesia, lithia, monoaluminium phosphate, cerium acetate and mixtures thereof. Preferably the additives are selected from the group consisting of colloidal silica and colloidal alumina.

Preferably the treating liquid comprises at least one of aluminium acetate boric (such as $CH_3CO_2.Al(OH)_2.1/3H_3BO_3$), aluminum fluoride (such as $AlF_3.3H_2O$), gibbsite ($Al(OH)_3$) and aluminium nitrate (such as $AlNO_3.9H_2O$) in combination with the borate of sodium. Even more preferably, the treating liquid is an aqueous solution. Optionally, the treating solution further contains at least one additive from the group consisting of other aluminium compounds (including the nuclei-forming compounds, aluminium acetate boric, aluminium fluoride and aluminium nitrate), calcium compounds, sodium compounds, magnesium compounds, silicon compounds, elemental carbon, elemental aluminium, said additive being in the form of a powder, in suspension, as a colloid, or in solution.

The treating liquid impregnates the carbon body preferably to a depth of approximately 0.5 to 10 cm, even more preferably to a depth of approximately 2 to 5 cm. The weight concentration of boron in the impregnated portion of the carbon body can be as high as 2%, more preferably in the range of from 10 ppm to 1.7%, and most preferably from 10 ppm to 1%.

The impregnation treatment can also be applied to a carbon mass forming a self-feeding Söderberg anode, preferably by treating only the part of the mass subjected to oxidation by air and anodically-evolved oxidizing gases. The invention also concerns an electrolytic cell for the production of aluminium, in particular by the electrolysis of alumina in a molten fluoride electrolyte such as cryolite, comprising a pre-baked or Söderberg anode, or a sidewall or other component, as set out above, the anode or sidewall or other component being installed with the treated surfaces in contact with air and oxidizing gases released during operation of the cell.

The invention also concerns the treating liquid itself. The treating liquid generally comprises from 2 to 20 grams of a boron-containing compound, such as boric acid, and from 0.004 to 0.4 grams of the additive per 100 ml of treating liquid. In one preferred formulation the treating liquid comprises approximately 10 grams of $H_3BO_3$ and from about 0.05 to 5 ml of colloidal silica comprising 30 wt% silica per 100 ml treating liquid. The treating liquid may further comprise colloidal alumina, and additionally a compound selected from the group consisting of $AlF_3.3H_2O$, $CH_3CO_2.Al(OH)_2.1/3H_3BO_3$, $Al(OH)_3$, and $AlNO_3.9H_2O$.

A further inventive feature is that at the end of the service life of the boron-impregnated anodes, the remaining anode butt can be treated by thermal means or by means of water or another solvent or solvents, or by spray washing, to remove the remaining boron compounds, before recycling the remaining carbon to be mixed with fresh carbon for the manufacture of new anodes. By processing the used anode butts in this way, the residual boron is removed from the carbon, so that the new anodes including the recycled carbon do not contain boron throughout their mass. This is desirable, for if the new anodes contain boron throughout their mass, it would result in an increase in the boron level in the product aluminium. However, the content of boron in the cast house can be reduced to any desirable low level.

Short and Long Term Oxidation Test Results

Treatment liquids were prepared by adding from 5 to 21 grams boric acid, from 0 to 5 ml colloidal silica, from 0 to 0.01 gram (i.e., from 0 to 0.1 ml) colloidal alumina, and from 0 to 0.1 grams aluminium fluoride to 100 ml of water. The compositions and designations are set forth below in Table 1.

TABLE 1

Designations for the treatment liquids. The amounts shown were added to 100 ml $H_2O$.

| Designation | Boric acid g | Colloidal Silica ml | Colloidal Alumina ml or g | $AlF_3 \cdot 3H_2O$ g |
|---|---|---|---|---|
| 5H | 5 g | | | |
| 10H | 10 g | | | |
| 21H | 21 g | | | |
| 5H/0.1 CS | 5 g | 0.1 ml SP 830 | | |
| 7H/0.1 CS | 7 g | 0.1 ml SP 830 | | |
| 8H/0.1 CS | 8 g | 0.1 ml SP 830 | | |
| 10H/0.1 CS | 10 g | 0.1 ml SP 830 | | |
| 10H/0.05 CS | 10 g | 0.05 ml SP 830 | | |
| 10H/0.1 CS | 10 g | 0.1 ml SP 830 | | |
| 10H/1 CS | 10 g | 1 ml SP 830 | | |
| 10H/5 CS | 10 g | 5 ml SP 830 | | |
| 10H/0.025 CS/0.01 P | 10 g | 0.025 ml SP 830 | 0.01 g P2 | |
| 10H/0.05 CS/0.01 P | 10 g | 0.05 ml SP 830 | 0.01 g P2 | |
| 10H/0.05 CS/0.01 AlF | 10 g | 0.05 ml SP 830 | | 0.1 g |
| 10H/0.05 CS/0.1 CA | 10 g | 0.05 ml SP 830 | 0.1 ml AL-20 | |
| 12H/16 CS | 12.2 g | 16.4 ml SP 830 | | |

Anodes: Eastalco Anodes
H: Boric acid, from Fischer
CS: colloidal silica
CA: colloidal alumina
SP830: Colloidal Silica, from Nyacol, content 30 wt% Silica, specific gravity 1.2
AL-20: Colloidal alumina, from Nyacol
P2: Colloidal alumina, from Condea
AlF: Alumina Fluoride, $AlF_3 \cdot 3H_2O$ from Johnson Matthey Tests were conducted with non-impregnated carbon samples and with carbon samples impregnated with treating liquids according to the present invention. The samples were treated by dipping the samples into the treatment solutions and drying the samples prior to the oxidation testing.

Table 2 set forth oxidation weight loss as a function of the loading. The loading is the measured uptake of the boron compounds and any additives after treatment.

TABLE 2

The oxidation values at 600° C. as a function of loading

| Treatment | Loading % | Loading g/cm$^3$ | Oxidation Weight Loss 600° C. 2 hrs ($10^{-2}$) g/cm$^2$ | 5 hrs | 18 hrs |
|---|---|---|---|---|---|
| Untreated | | | 11.02 to 13.4 | 28.1 to 32.39 | 64.82 to 84.32 |
| 5H | 0.19 | 0.00296 | 1.98 | 8.33 | 53.13 |
| 10H | 0.40 to 0.62 | 0.00626 to 0.00974 | 2.06 to 2.2 | 6.18 to 7.64 | 37.4 to 55.50 |
| 21H | 0.43 to 1.72 | 0.0071 to 0.0266 | 0.04 to 2.76 | 1.41 to 7.88 | 11.5 to 45.09 |
| 5H/0.1 CS | 0.21 to 0.25 | 0.00321 to 0.00375 | 0.9 to 1.47 | 4.07 to 4.72 | 25.82 to 54.03 |
| 7H/0.1 CS | 0.39 to 0.50 | 0.00608 to 0.00762 | 0.76 to 1.09 | 2.62 to 3.75 | 30.40 to 43.20 |
| 8H/0.1 CS | 0.38 | 0.00600 | 1.13 | 3.58 | 34.67 |
| 10H/0.05 CS | 0.29 to 0.56 | 0.00451 to 0.00858 | 0.61 to 2.36 | 2.66 to 6.59 | 21.6 to 32.77 |
| 10H/0.1 CS | 0.44 to 0.55 | 0.00684 to 0.00851 | 0.21 to 0.72 | 1.92 to 1.93 | 10.99 to 30.46 |
| 10H/1 CS | 0.52 | 0.00822 | 2.39 | 8.39 | 57.72 |
| 10H/5 CS | 1.24 | 0.01883 | 1.92 | 5.44 | 31.48 |
| 10H/0.025 CS/0.01P | 0.48 to 1.70 | 0.00948 to 0.0258 | 0.55 to 2.15 | 1.50 to 8.32 | 15.6 to 64.71 |
| 10H/0.05 CS/01 AlF | 0.37 to 0.50 | 0.00576 to 0.00763 | 0.10 to 0.74 | 2.05 to 3.16 | 18.6 to 30.0 |
| 10H/0.05 CS/0.1CA | 0.34 to 0.53 | 0.00538 to 0.00813 | 0.53 to 1.49 | 2.18 to 12.41 | 8.3 to 61.0 |
| 12H/16 CS | 1.10 to 1.44 | 0.01727 to 0.2240 | 1.50 to 2.13 | 6.04 to 7.60 | 39.5 to 51.4 |

The data in Table 2 demonstrate that with increasing concentration of boric acid the average total loading after impregnation increases and the oxidation weight loss decreases. The data also demonstrate that the addition of additives, e.g., colloidal silica and colloidal alumina, increases the oxidation resistance.

FIG. 1 graphically shows average oxidation weight loss at 600° C., as a function of amount of boric acid. The treating liquid comprised varying amounts of boric acid either with or without 0.1 ml of colloidal silica containing 0.036 g of solid silica. It can be seen from FIG. 1 that the average weight loss due to oxidation at 600° C., for roughly the same amount of boric acid, is much lower for the samples including the silica additive, than for the samples without the silica additive. In fact, it can also be seen that for much lower amounts of boric acid, equivalent weight loss can be obtained using the treatment solutions containing the silica additive.

Figure 2:
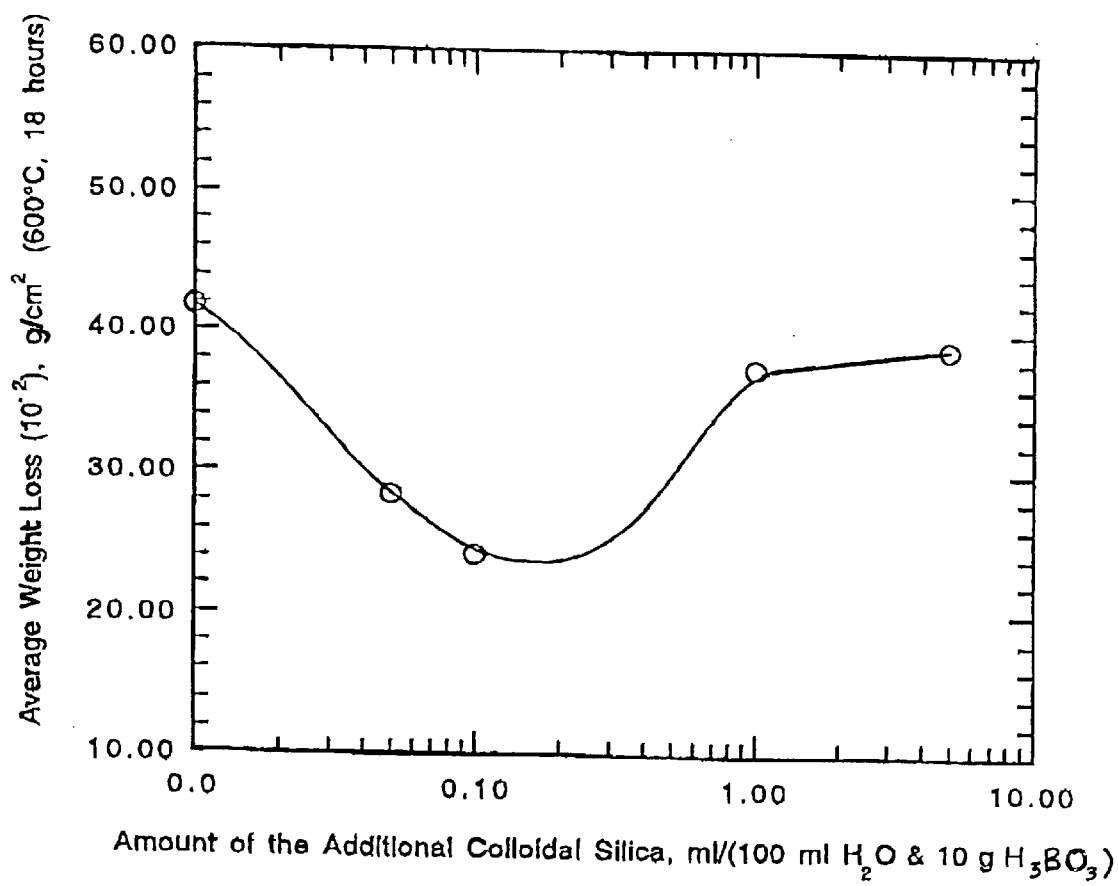
FIG. 2 graphically shows average oxidation weight loss at 600° C. as a function of varying amounts of colloidal silica.

FIG. 2 graphically shows average oxidation weight loss at 600° C., as a function of the amount of colloidal silica, together with water and a boron compound such as $H_3BO_3$. Varying amounts of colloidal silica were added to a treating liquid comprising 10g $H_3BO_3$ in 100 ml $H_2O$. The addition of the additive improved oxidation resistance compared to samples treated only with boric acid. As seen clearly in FIG. 2, the weight loss decreases as a function of increasing silica additive, up to about 0.10 to 0.12 gms of colloidal silica. If one adds more colloidal silica, the average weight loss actually increases and later stabilizes at a high level.

Additional embodiments and modifications within the scope of the claimed invention will be apparent to one of ordinary skill in the art. Accordingly, the scope of the present invention shall be considered in the terms of the following claims, and is understood not to be limited to the details of the methods described in the specification.

We claim:

1. A method of treating a carbon body which is subject to high temperature oxidizing gases, said body being a component of an electrolytic cell for the production of aluminium, to improve the resistance of the body to deterioration by said oxidizing gases, which comprises applying to said body a treating liquid comprising a precipitable boron-containing compound and an additive for enhancing the oxidation resistance properties of said boron-containing compound, when precipitated and cured, and precipitating and curing boron-containing compound, said additive being present in an amount up to about 2 weight percent, of the total of the additive and the boron oxide present in the boron-containing compound, said amount being effective to modify the morphology of the precipitate of said boron-containing compound and such that substantially no separate phase apart from the precipitate of said boron-containing compound, is formed, upon curing.

2. The method of claim 1, wherein the additive is present at a level up to about 0.8 weight percent, of the of the total of the additive and the boron oxide present in the boron-containing compound.

3. The method of claim 1, wherein the treating liquid comprises from 2 to 20 grams of boron oxide from said boron-containing compound and 0.004 to 0.4 gms of additive, per 100 ml of treating liquid.

4. The method of claim 1, wherein said boron-containing compound is dissolved in a solvent selected from the group consisting of water, methanol, ethylene glycol, glycerin, and mixtures thereof.

5. A carbon body being a component of an electrolytic cell for the production of aluminium, which has a part of its surface exposed during use to high temperature oxidizing gases, said surface part being impregnated, to improve the resistance thereof to deterioration by said oxidizing gases, with a precipitated and cured boron compound obtained from a treating liquid comprising a precipitable boron-containing compound and an additive for enhancing the oxidation resistance properties of said boron-containing compound when precipitated and cured, said additive being present in an amount up to about 2 weight percent, of the total of the additive and the boron oxide present in the boron-containing compound said amount being effective to modify the morphology of the precipitate of said boron-containing compound and such that substantially no separate phase apart from the precipitate of said boron-containing compound, is formed, upon curing.

6. The body of claim 5, wherein the additive is present at a level up to about 0.8 weight percent, of the total of the additive and the boron oxide present in the boron-containing compound.

7. The body of claim 5, impregnated with a treating liquid comprising from 2 to 20 grams of boron oxide from said boron-containing compound and 0.004 to 0.4 grams of additive, per 100 ml of treating liquid.

8. A treating liquid for treating a substrate, comprising a precipitable boron-containing compound and an additive for enhancing the oxidation resistance properties of said boron-containing compound when precipitated and cured, said additive being present in an amount up to about 2 weight percent, of the total of the additive and the boron oxide present in the boron-containing compound said amount being effective to modify the morphology of the precipitate of said boron-containing compound and such that said additive forms substantially no separate phase apart from the precipitate of said boron-containing compound, when precipitated and cured, wherein the boron-containing compound is selected from the group consisting of boron oxide, boric acid, precursors of boric acid which form boron oxide, tetraborates of alkali metals and mixtures thereof and wherein said additive is selected from the group consisting of colloidal alumina, silica, yttria, ceria, thoria, zirconia, magnesia, lithia, monoaluminium phosphate, cerium acetate and mixtures thereof.

9. The treating liquid of claim 8, wherein the additive is present at a level up to about 0.8 weight percent, of the total of the additive and the boron oxide present in the boron-containing compound.

10. The treating liquid of claim 8, wherein the treating liquid comprises from 2 to 20 grams of boron oxide from said boron-containing compound and 0.004 to 0.4 grams of the additive, per 100 ml of treating liquid.

* * * * *